Figures 1, 2, 3, 4:
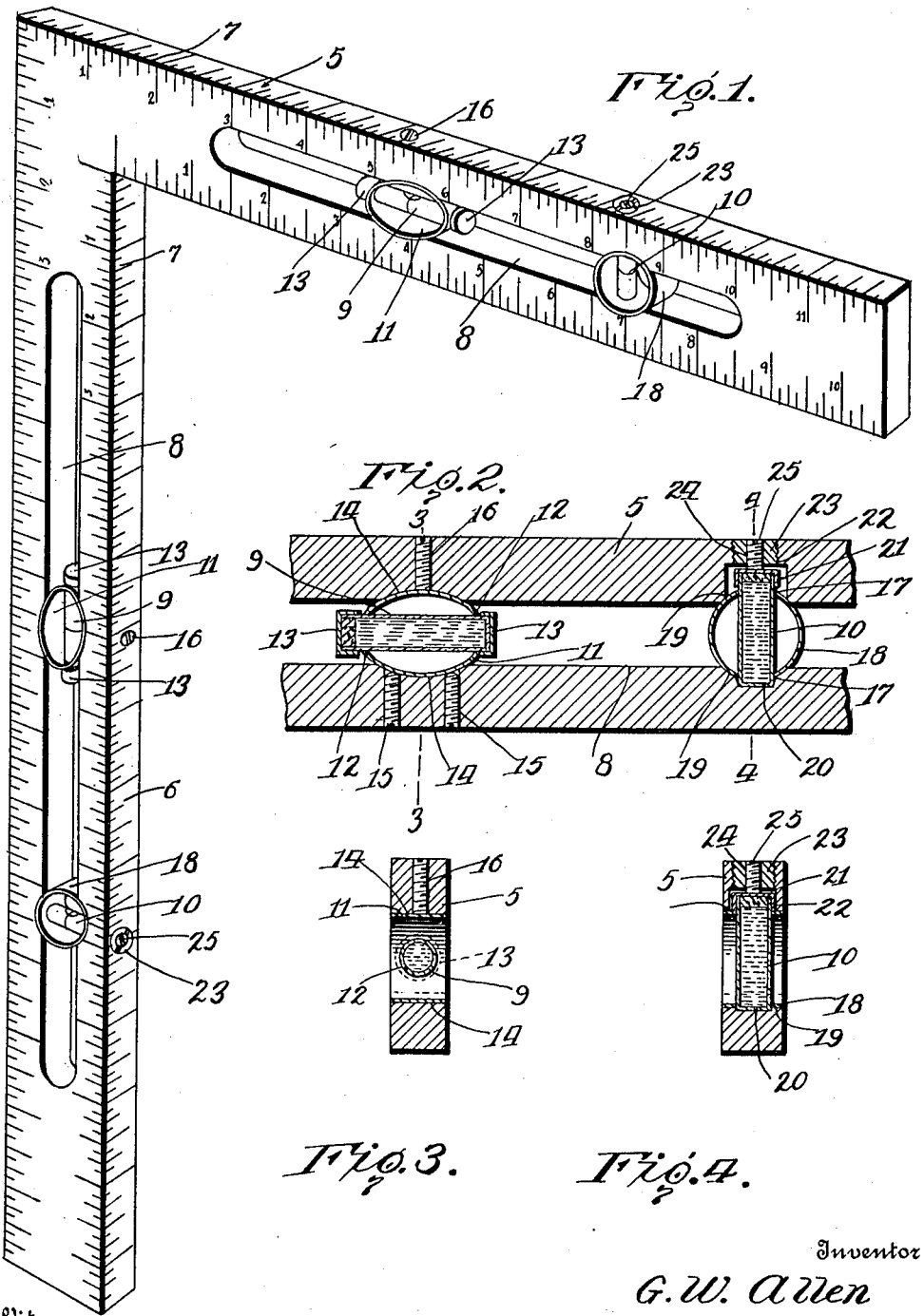

G. W. ALLEN.
COMBINED SQUARE AND LEVEL.
APPLICATION FILED APR. 7, 1911.

1,022,396.

Patented Apr. 9, 1912.

Witnesses
W. N. Woodson
Juana M. Fallin

Inventor
G. W. Allen

By
Attorneys.

UNITED STATES PATENT OFFICE.

GEORGE W. ALLEN, OF CORVALLIS, OREGON.

COMBINED SQUARE AND LEVEL.

1,022,396.  Specification of Letters Patent.  Patented Apr. 9, 1912.

Application filed April 7, 1911. Serial No. 619,597.

*To all whom it may concern:*

Be it known that I, GEORGE W. ALLEN, citizen of the United States, residing at Corvallis, in the county of Benton and State of Oregon, have invented certain new and useful Improvements in Combined Squares and Levels, of which the following is a specification.

The present invention comprehends certain new and useful improvements in measuring instruments, and the object of the invention is to provide an improved square which may be employed for ascertaining at the same time whether an object, such as a door or window frame or the foundation of a building, is square, level, and plumb.

Another object of the invention is to provide a square consisting of a pair of graduated arms, each of which carries two spirit tubes, one tube being disposed longitudinally of the arm and the other tube extending transversely with respect thereto.

A further object of the invention is to provide improved means for mounting the spirit tubes in the arms so that they are thoroughly housed and are susceptible of being conveniently adjusted as occasion requires.

With these and other objects in view, as will more fully appear as the description proceeds, the invention consists of certain constructions, arrangements and combinations of the parts that I shall hereinafter fully describe and claim.

For a full understanding of the invention, reference is to be had to the following description and accompanying drawing, in which:

Figure 1 is a perspective view of a measuring instrument constructed in accordance with my invention; Fig. 2 is a fragmentary longitudinal section of one of the arms; Fig. 3 is a transverse section on the line 3—3 of Fig. 2; and, Fig. 4 is a transverse section on the line 4—4 of Fig. 2.

Corresponding and like parts are referred to in the following description and indicated in all the views of the accompanying drawing by the same reference characters.

My improved instrument includes a square consisting of a pair of perpendicular arms or members which are designated 5 and 6 respectively. The arms are preferably formed integrally and are of the same cross sectional contour, each arm having flat side faces and straight longitudinal edges. It is to be noted that the corresponding side faces of the arms lie in substantially the same plane so as to permit the square to be laid flat on a supporting surface. Suitable scales 7 are provided along both the inner and outer edges of the square. In the present instance, for convenience, these scales are graduated on the edges themselves and are also displayed on both side faces of the square along said edges. The scales may be laid off in inches and fractions thereof, or in any other suitable unit of measure.

Each arm of the square is substantially frame-like in structure and is formed with a longitudinal opening 8 extending transversely entirely therethrough, the side walls of said opening being substantially parallel. In each opening 8 there is mounted a pair of spirit tubes or glasses which are designated 9 and 10 respectively. The tube 9 is disposed longitudinally in the direction of the length of the arm and indicates whether or not the arm is level, while the other tube 10 is arranged transversely in the opening to indicate the plumb. These tubes will be hereinafter referred to as the level tube, and the plumb tube respectively. By providing the perpendicular tubes on each arm of the square, the instrument will indicate at the same time whether an object is square, level, and plumb. This is particularly convenient in construction work for testing the foundation of a building, the frames of doors and windows, or other structural parts.

Each level glass 9 is carried in a substantially elliptical spring frame 11, with its ends supported in and projecting through openings 12 formed at the ends of the major axis of the frame. Caps 13 are fitted on both projecting ends of the tube and serve the dual function of protecting said ends and of holding the tube against longitudinal movement in the openings. The material forming the frame is of substantially the same width as the thickness of the arm, and the level tube is held in the frame between the planes of the side faces of the arm, so as to be thoroughly housed. The sides of the frame are received in opposed concave seats 14 that are provided in the side walls of the opening 8. Two screws 15 are inserted transversely through one side edge of the arm and these screws project from one of the concave seats 14 and bear against the adjacent side of the frame at points on opposite sides of and approximately equidistant from the minor axis of the frame. These screws are separately adjusted so as to exert pressure on the corresponding end portions of the frame to rock the frame in the other seat 14 and in the plane of the arm to regulate the position of the level tube to maintain it at all times in parallel relation to the longitudinal edges of the arm. A single screw 16 is inserted through the other side edge of the arm and projects from the corresponding seat 14 to engage the opposite side of the frame. This screw is disposed substantially in alinement with the minor axis of the frame and serves, when tightened, to compress the spring laterally to bind it securely in adjusted position. The particular arrangement of the adjusting screws and the clamping screw has been found quite efficient in practice, and is an important feature of the present invention. Each plumb tube 10 is also housed between the planes of the side faces of the arm and passes through diametrically opposite openings 17 formed in a circular spring frame 18, the frame being fitted in the opening 8 in longitudinally spaced relation to the frame 11 and being received in opposed concave seats 19 that are provided in the side walls of said opening. One of the seats is formed with a socket 20 which registers with the adjacent opening 17 and receives one end of the plumb tube. The other end of the plumb tube is protected by a metal cap 21 and is held in an opening 22 which extends transversely from the other seat 19 and opens outwardly through the corresponding side edge of the arm. By means of this opening the plumb tube may be conveniently inserted in and removed from position as occasion requires. The plumb tube is retained in the opening 22 through the instrumentality of a screw plug 23 that is engaged in and closes the outer end of the opening. This plug has a central longitudinal bore 24 which is threaded to receive an adjusting screw 25 that works through the screw plug and is arranged to impinge against the metallic cap 21. The inner end of the opening 22 is enlarged in the direction of the length of the arm so as to be greater in width than the diameter of the tube to permit the tube and the frame to have a slight rocking movement to adjust the angle of the tube with respect to the arm. The parts are securely retained in adjusted position by tightening the screw 25 against the metallic cap 21.

What I claim is:

1. A measuring instrument including a member formed with an elongated opening having substantially parallel side walls, said side walls being provided at opposite points with co-acting concave seats, a continuous curved frame housed within said opening and fitting between the seats, a spirit level carried by and extending across the frame, the frame being movable on the seats in the plane of the member to adjust the spirit tube with respect to the member, and means for securing the frame in different adjusted positions.

2. A measuring instrument including a member having an opening formed in opposite walls with co-acting concave seats, a continuous curved frame housed within said opening and fitting between the seats, a spirit tube carried by and extending across the frame, and means for moving the frame on the seats in the plane of the member to regulate the position of the spirit tube with respect to the member.

3. A measuring instrument including a member formed with an opening, a continuous spring frame housed within the opening and interposed between opposite walls thereof, a spirit tube carried by and extending across the frame, the frame being movable in the plane of the member to regulate the position of the tube with respect thereto, and means for compressing the spring frame to retain the same in adjusted position between said opposite walls of the opening.

4. In a measuring instrument, a member formed with an opening, an elliptical frame of spring material interposed between opposite walls of the opening, a spirit tube supported in the frame and disposed in the direction of the major axis of the frame, a pair of adjusting screws working in the member and engaging one side of the frame at points on opposite sides of and substantially equidistant from the minor axis of the frame, and a clamping screw also working in the member and adapted to bear against the other side of the frame at a point in the minor axis of said frame.

In testimony whereof, I affix my signature in presence of two witnesses.

GEORGE W. ALLEN. [L. S.]

Witnesses:
P. M. BEARDSLEY,
S. N. WARFIELD.

---

Copies of this patent may be obtained for five cents each, by addressing the "Commissioner of Patents, Washington, D. C."